Oct. 2, 1962   T. K. KEHLER   3,056,425
AUTOMATIC RING PLATE VALVES
Filed April 19, 1960

INVENTOR
THEODOR K. KEHLER
BY
ATTORNEYS

United States Patent Office 3,056,425
Patented Oct. 2, 1962

3,056,425
AUTOMATIC RING PLATE VALVES
Theodore Karl Kehler, Vienna, Austria, assignor to ENFO Entwicklungs- und Forschungs - Aktiengesellschaft, Vaduz, Liechtenstein
Filed Apr. 19, 1960, Ser. No. 23,301
Claims priority, application Austria Apr. 24, 1959
3 Claims. (Cl. 137—516.21)

This invention relates to a ring plate valve, in which a spring-loaded valve plate is mounted between a seat plate and a valve guard. The valve plates used in such valves have usually a closed circular circumference and contain annular slots in several rows. Valve plates of this form are found to be relatively stiff and for this reason lift from the seat simultaneously with their entire surface when the valve is being opened and after overcoming the spring forces impinge with their entire surface on the valve guard or on the intervening spring plates or the like which are pressed flat. Likewise the valve plates impinge with their entire surface on the seat when the valve is being closed. The continual hard impacts create an increased breakage risk, particularly in high-speed piston compressors, and numerous fractures are mainly due to this fact. Besides, the hard impacts of the valve plates give rise to loud noise. Finally, the initial stress of the spring somewhat retards the opening, whereby the rate of the fluid being conveyed is throttled.

Single- and multiple-ring valves have been disclosed, the plates of which are divided in a high degree by slots and which have been designed to form links. These plates, which may cooperate with springs, act rather like flaps and expose considerable portions of the lifting slots only in part, whereby the resistance to flow is considerably increased.

Single-ring valves having radial link arms have also been proposed, in which the valve plate is divided into segments by long slots which originate at the outer rim and which extend radially in the link arm. The segments are connected only by the remaining central portion and are not spring-loaded.

It is a feature of the invention to provide an automatic ring plate valve comprising a seat plate, a valve guard and a spring-loaded valve plate, which is disposed between the seat plate and the valve guard and has radial cuts originating at the rim of the valve plate and dividing the same into sectors, which are interconnected by parts of the valve plate.

It is another feature of the invention that the radial cuts extend in the webs of the valve plate.

It is also a feature of the invention that the sectors are associated with and engaged by springs, and are preferably elastically curved at least at the beginning of the opening and closing movements of the valve.

Figure 1:
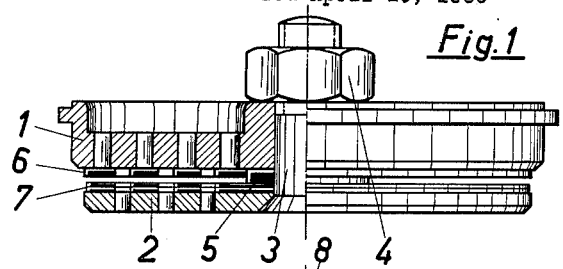
Figure 2:
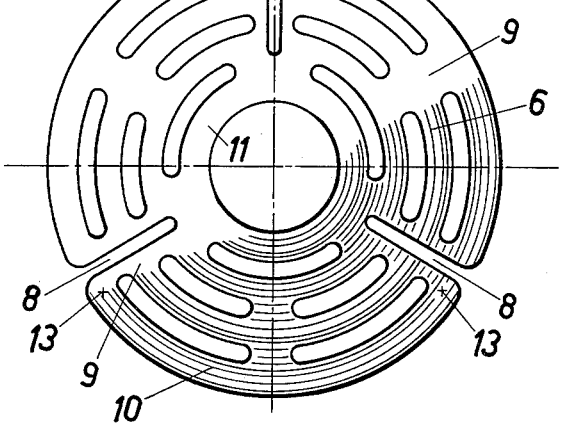
Figure 3:
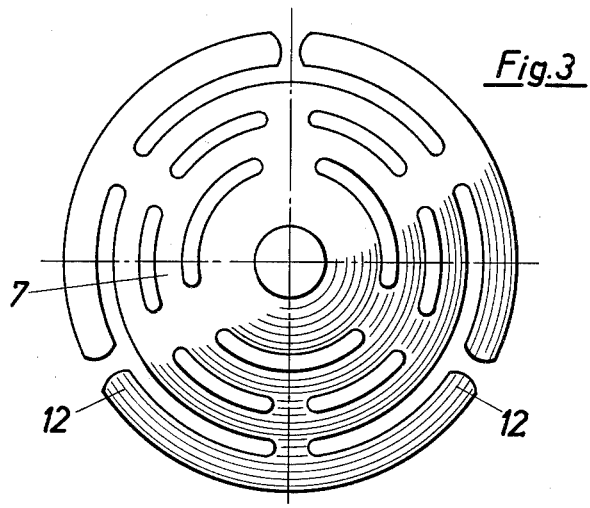

An illustrative embodiment of the valve according to the invention is shown on the drawing. FIG. 1 is a view of the valve partly in section and partly in side elevation. FIG. 2 shows the valve plate and FIG. 3 shows a spring plate in top plan view.

The valve comprises in the usual manner a seat plate 1 and the valve guard 2. These parts are rigidly interconnected by the central bolt 3 and a nut 4 (FIG. 1). A washer 5 determines the distance of the valve guard from the seat plate. In the selected embodiment the valve plate 6 is slidingly guided on the washer 5. Alternatively it may be provided with the known link motion. Finally, two spring plates 7 are provided, the resilient tongues of which have been omitted in the drawing to enable a clearer showing. All superimposed parts of the valve have the usual, relatively staggered annular slots, which are interrupted by radial webs 9. The valve plate (FIG. 2) is provided with several, e.g., three radial cuts 8, which extend suitably in the webs 9. In the construction shown in the drawing the cuts 8 originate at the outside rim 10 of the plate so as to subdivide said rim whereas the inside rim 11 (rim of hole) remains as a closed ring. The valve plate is thus divided into three interconnected portions having the form of a sector of a circle and has approximately the form of a clover-leaf. The radial cuts 8 may originate at the inside rim 11 of the plate; in this case the outer rim 10 remains undivided. Finally the radial cuts 8 in the valve plate may originate alternately at the outside and inside rims. The spring plate 7 shown in FIG. 3 corresponds to one of the usual forms and is shown in the position in which it is placed on the valve plate in the selected example. The spring arms 12 engage the rim portions of the sectors. The spring elements may also engage the center of the sectors so that the rims remain unloaded and can lift before. The design will depend on whether harder impacts are to be expected during the opening and closing of the valve. The spring plate may be replaced by other spring members according to the specification.

This design of the valve plate in conjunction with suitably arranged spring elements results in very desirable properties of the valve. The radial cuts reduce the resistance to bending of the valve plate in the circumferential direction. Under the influence of the mutually opposing forces of the gas pressure and the spring load the plate divided into interconnected individual sectors can elastically deform more easily. For this reason it will not impinge on the valve guard or seat with its entire surface at one time because the deformation is retained during the opening and closing movements and the flattening does not take place until the end positions have been reached. This will substantially reduce the impact, resulting in a reduced noise during operation. The mechanical stresses are reduced too because an elastically deformable plate will adapt itself to its loading and can yield to the forces acting thereon whereas a rigid plate is subject to an internal initial stress and has a strong resistance to the attack of forces so that it will be much more sensitive to impact. Finally, those zones of the several sectors which are not spring-loaded can lift from the seat somewhat before the regions which are held back by spring pressure. Thus the beginning of the opening movement is advanced, resulting in a smaller pressure loss.

What is claimed is:

1. An automatic ring plate valve comprising a seat plate having connected portions, a valve guard and a spring-loaded valve plate, said valve plate being disposed between the seat plate and the valve guard, means mounting said valve plate for reciprocal movement of one of said portions between a closed position and a fully open position, said valve plate having in another of said portions at least one boundary rim defining a sealing part and a number of passage slots adjacent thereto, radially extending webs being provided in said valve plate between the passage slots, said webs being formed with cuts extending radially from said one rim of the valve plate, said cuts being disposed in the sealing part of the valve plate and dividing the same into sectors, each of said sectors being loaded by an additional spring element engaging only a portion of the sealing rim of said sector.

2. An automatic ring plate valve comprising a seat plate having connected portions, a valve guard and a spring-loaded valve plate, said valve plate being disposed between the seat plate and the valve guard, means mounting said valve plate for reciprocal movement of one of said portions between a closed position and a fully open position, said valve plate having in another of said portions at least one boundary rim defining a sealing part and a plurality of passage slots adjacent thereto, radially extending webs being provided in said valve plate between said passage slots, said webs being formed with cuts radially extending from said one rim of the valve plate, said cuts being disposed in the sealing part of the valve plate and dividing the same into sectors, at least one spring plate being provided for spring-loading the valve plate, and said spring plate having spring arms each engaging a part of the sealing rim of one of said sectors.

3. An automatic ring plate valve comprising a seat plate, a valve guard and a spring-loaded valve plate, said valve plate being disposed between the seat plate and the valve guard and having outer and inner boundary rims and a plurality of passage slots, one of said rims defining a sealing part and the other rim defining a guiding part of the valve plate, radially extending webs being provided between said passage slots, said webs being formed with cuts extending radially from said one rim of the valve plate, said cuts being disposed in the sealing part of the valve plate and dividing the same into sectors and defining side edges of the sectors, at least one spring plate being provided for spring-loading the valve plate, said spring plate having spring arms engaging lateral edge portions of the sectors adjacent to said one rim and the radial cuts.

References Cited in the file of this patent

UNITED STATES PATENTS

| | | |
|---|---|---|
| 724,641 | Wiki | Apr. 7, 1903 |
| 793,214 | Neuhaus | June 27, 1905 |
| 1,188,969 | Meister | June 27, 1916 |
| 1,376,484 | Tuttle | May 3, 1921 |
| 2,139,313 | Neubauer | Dec. 6, 1938 |
| 2,725,075 | Irgens | Nov. 29, 1955 |

FOREIGN PATENTS

| | | |
|---|---|---|
| 788,268 | Great Britain | Dec. 23, 1957 |